(12) United States Patent
Loveless et al.

(10) Patent No.: US 9,989,162 B2
(45) Date of Patent: Jun. 5, 2018

(54) DUAL CARTRIDGE TEMPERATURE CONTROL VALVE

(71) Applicant: PROFIRE ENERGY, INC, Lindon, UT (US)

(72) Inventors: Mark R. Loveless, Mapleton, UT (US); Melvin Hal Parks, Pleasant Grove, UT (US); Justin W. Hatch, Spanish Fork, UT (US)

(73) Assignee: PROFIRE ENERGY, INC, Lindon, UT (US)

( * ) Notice: Subject to any disclaimer, the term of this patent is extended or adjusted under 35 U.S.C. 154(b) by 0 days. days.

(21) Appl. No.: 14/470,910

(22) Filed: Aug. 27, 2014

(65) Prior Publication Data
US 2015/0059874 A1 Mar. 5, 2015

Related U.S. Application Data

(60) Provisional application No. 61/870,776, filed on Aug. 27, 2013, provisional application No. 61/870,691, filed on Aug. 27, 2013.

(51) Int. Cl.
| | |
|---|---|
| *F16K 27/00* | (2006.01) |
| *F16K 41/02* | (2006.01) |
| *F16K 31/04* | (2006.01) |
| *G05D 16/20* | (2006.01) |
| *G05D 7/06* | (2006.01) |
| *F16K 27/08* | (2006.01) |

(52) U.S. Cl.
CPC ............. *F16K 27/00* (2013.01); *F16K 31/04* (2013.01); *F16K 41/02* (2013.01); *G05D 7/0635* (2013.01); *G05D 16/202* (2013.01); *F16K 27/08* (2013.01); *Y10T 137/7758* (2015.04); *Y10T 137/7761* (2015.04)

(58) Field of Classification Search
CPC . F16K 1/42; F16K 1/422; F16K 1/425; F16K 1/427; F16K 27/00; F16K 27/08; F16K 41/02; F16K 31/04; Y10T 137/6017; Y10T 137/7758; Y10T 137/7761; G05D 16/202; G05D 7/0635
USPC .................................................. 251/360, 363
See application file for complete search history.

(56) References Cited

U.S. PATENT DOCUMENTS

| | | | | |
|---|---|---|---|---|
| 1,960,963 A | * | 5/1934 | Wheeler | F16K 15/06 137/454.2 |
| 2,772,068 A | * | 11/1956 | Grove | F16K 3/246 251/210 |
| 2,845,085 A | * | 7/1958 | Robbins | F16K 1/42 137/454.6 |
| 3,506,242 A | * | 4/1970 | Aunspach | F16J 15/125 251/361 |
| 3,521,667 A | * | 7/1970 | Johnson | F16K 27/02 137/454.6 |
| 3,601,165 A | * | 8/1971 | Obata | F23Q 2/52 141/295 |

(Continued)

*Primary Examiner* — William McCalister
(74) *Attorney, Agent, or Firm* — Stoel Rives, LLP

(57) ABSTRACT

A dual cartridge temperature control valve having a self-contained, top loading bonnet cartridge and a self-contained, bottom loading seat cartridge. The control valve body may include internally configured pressure channels configured to mate with the upstream and downstream pressure channels of a control valve actuator having internally integrated pressure channels.

7 Claims, 6 Drawing Sheets

(56) References Cited

U.S. PATENT DOCUMENTS

| | | | | |
|---|---|---|---|---|
| 3,746,305 A * | 7/1973 | Zakka | ................... | F16K 1/422 |
| | | | | 251/360 |
| 3,762,685 A * | 10/1973 | Curran | ................... | F16K 27/02 |
| | | | | 137/454.6 |
| 3,779,508 A * | 12/1973 | Paul, Jr. | ............. | F16K 27/0245 |
| | | | | 251/124 |
| 3,911,948 A * | 10/1975 | Collins, Jr. | ............ | G05D 16/02 |
| | | | | 137/505.11 |
| 4,469,123 A * | 9/1984 | Merrill | ................... | F16K 43/00 |
| | | | | 137/315.11 |
| 5,113,898 A * | 5/1992 | White | ................ | G05D 16/0666 |
| | | | | 137/454.5 |
| 5,161,565 A * | 11/1992 | Jamieson | ................ | F04B 39/10 |
| | | | | 137/315.13 |
| 5,806,563 A * | 9/1998 | Rabby | ................... | E21B 34/06 |
| | | | | 137/613 |
| 6,752,377 B1 * | 6/2004 | Taylor | ................... | F16K 17/04 |
| | | | | 251/360 |
| 6,953,183 B2 * | 10/2005 | Uryu | ................. | F16K 31/0665 |
| | | | | 251/129.08 |
| 7,296,591 B2 * | 11/2007 | Moe | ................... | F04B 53/109 |
| | | | | 137/454.4 |
| 2002/0134961 A1 * | 9/2002 | Antoff | ................ | F04B 53/1025 |
| | | | | 251/363 |

* cited by examiner

DUAL CARTRIDGE TEMPERATURE CONTROL VALVE

PRIORITY

The present application claims the benefit under 35 U.S.C. § 119 (e) of each of U.S. Provisional Patent Application Ser. No. 61/870,691 entitled "Temperature Control Valve Actuator Assembly" filed on Aug. 27, 2013 and U.S. Provisional Patent Application Ser. No. 61/870,776 entitled "Dual Cartridge Temperature Control Valve" filed on Aug. 27, 2013, each of which is incorporated herein by reference in its entirety.

THE FIELD OF THE INVENTION

The present invention relates to control valves for use in a valve train. More specifically, the present invention relates to a novel dual cartridge temperature control valve used in valve trains for a combustion application at an oil or gas well site.

BACKGROUND

Combustion applications are commonly used at oil and gas well sites in association with heater tanks, separators, treaters, amine re-boilers, and line heaters. Fuel being supplied to a burner unit or pilot in a combustion application is commonly channeled through a valve train before the fuel reaches the combustion site. Valve trains commonly include a control valve for, among other things, regulating fuel pressure, controlling fuel flow, and regulating temperature at the combustion site.

However, there are a number of disadvantages to control valves currently used in the industry. One disadvantage is that repairing and replacing control valve components is often difficult and time and labor intensive. Repairing or replacing the valve trim in control valves currently used in the industry often requires disassembling the control valve body or manifold. Cleaning and maintaining control valves may also be difficult for similar reasons.

Another problem is that commonly occurs in control valves currently used in the industry is wearing of a plug and seat from the continual battering of the plug against the seat as the control valve opens and closes. Also, packing or stuffing used in control valves wear out and may lose their elasticity or shape over time.

Thus, it is thus desirable to have an improved control valve that reduces labor and costs for installing, replacing, and repairing the valve components, reduces wear and tear on the control valve components, and increases the life of control valve components.

SUMMARY OF THE INVENTION

It is an object of the present invention to provide an improved control valve.

According to one aspect of the invention, a control valve is provided comprising a control valve body, a bonnet cartridge, and a seat cartridge. The valve body may include internally integrated pressure channels for transferring changes in pressure to pressure channels associated with pressure transducers disposed in a control valve actuator assembly.

In accordance with an embodiment of the present invention, the control valve is comprised of two cartridges, wherein a first cartridge is a bonnet cartridge which may top load into the control valve body and a second cartridge is a seat cartridge which may bottom load into the control valve body. In another aspect of the present invention, the bonnet cartridge is an internally self-contained, top-loading cartridge. The bonnet cartridge may be secured in a bonnet cartridge manifold in a top area of the valve body using a single spiral retaining ring or snap ring to hold the cartridge in place.

According to another aspect of the invention, the seat cartridges may be an internally self-contained, bottom loading cartridge. In accordance with another aspect of the present invention, the seat cartridge may include an integrated cleanout port with an integrated cleanout plug. According to another aspect of the present invention, the seat cartridge may include a valve seat which may be secured in the seat cartridge using a single spiral retaining ring or snap ring. The seat cartridge may be secured in a seat cartridge manifold in a bottom area of the valve body using threaded fittings.

In accordance with another aspect of the present invention, trim components may be replaced without removing the bonnet or packing. In another aspect of the invention, dual quad ring seals are used in place of packing or stuffing. In yet another aspect of the present invention, the control valve does not require loading of the packing box or stuffing box.

According to another aspect of the present invention, the trim includes integral, dual-seal characteristics, wherein the trim seal has both hard seal and soft seal features for improved seal and increased life of the trim. A plug may be configured with a quad ring seal so that when the control valve is actuated into a closed position the rubber quad ring seal comes into contact with the seat ring just before the metal plug comes into contact with the seat ring so that both the metal and the rubber have contact with the seat creating a dual seal and reducing impact and wear between the metal plug and the metal seat.

These and other aspects of the present invention are realized in a control valve as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single FIGURE, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed so as to enable one skilled in the art to practice the present invention. The drawings and descriptions are exemplary of various aspects of the invention and are not intended to narrow the scope of the appended claims.

Figure 1:
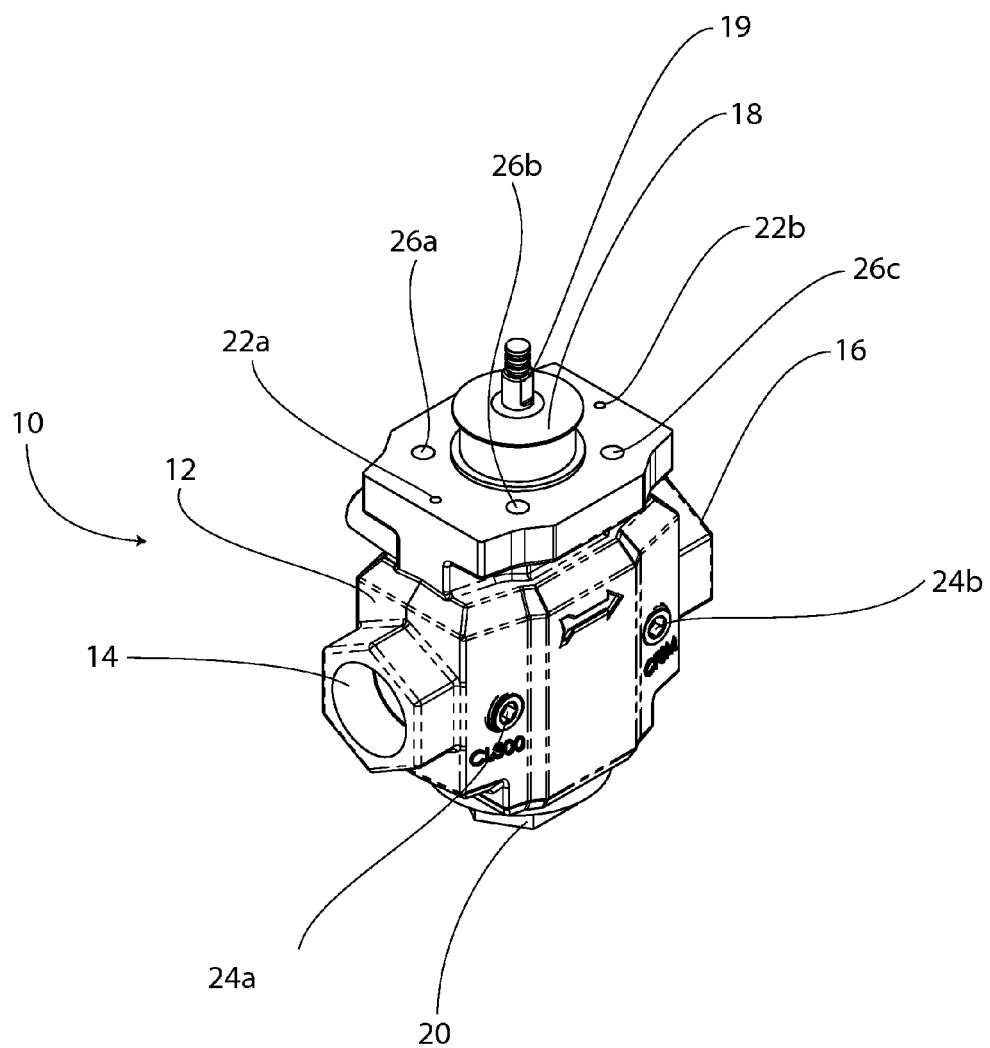
FIG. 1 shows a perspective view of a temperature control valve in accordance with the present invention.
Figure 2:
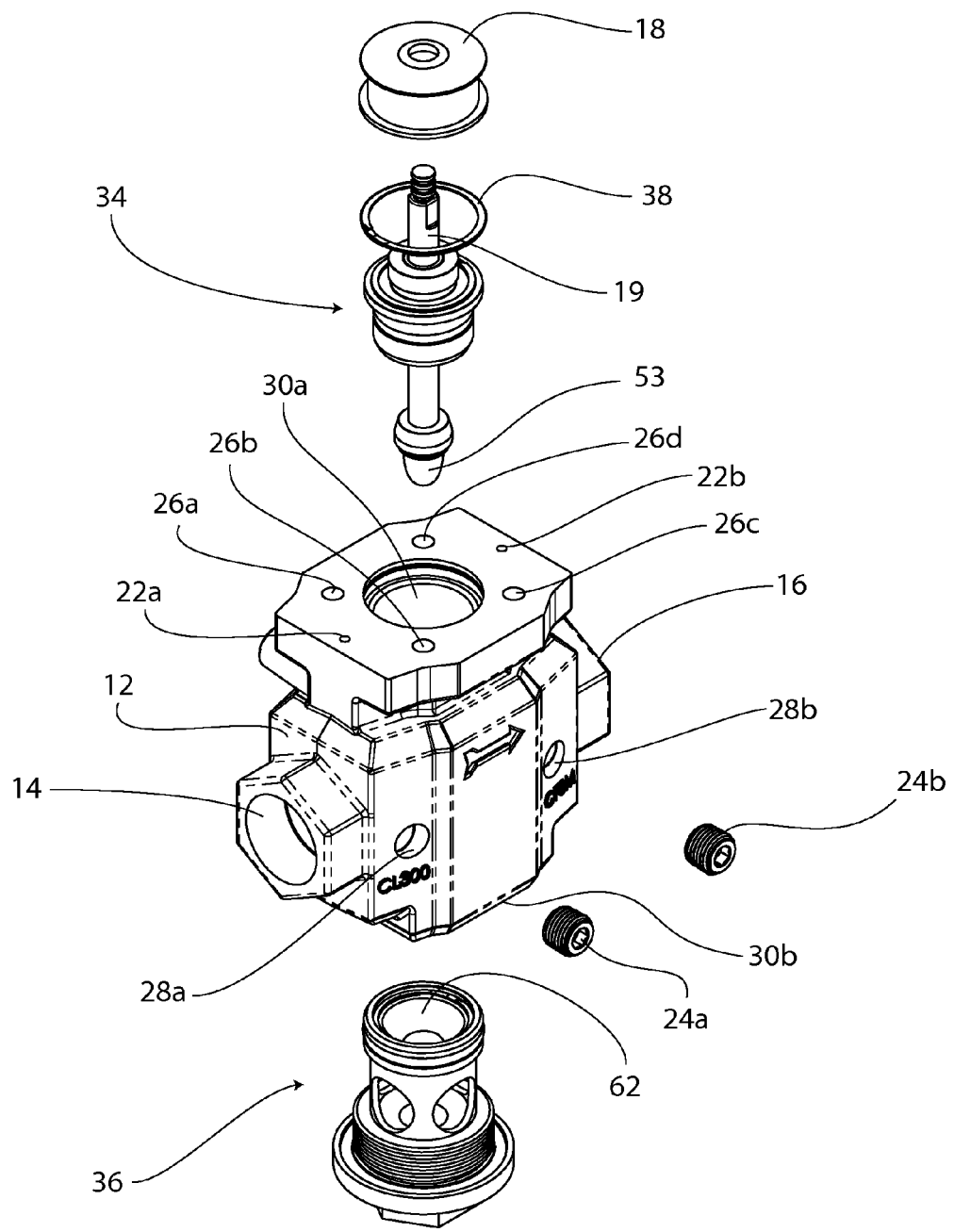
FIG. 2 shows a partially exploded view of a temperature control valve having a bottom-loading, self-contained seat cartridge and a top-loading, self-contained bonnet cartridge in accordance with one or more aspects of the present invention.
Figure 3:
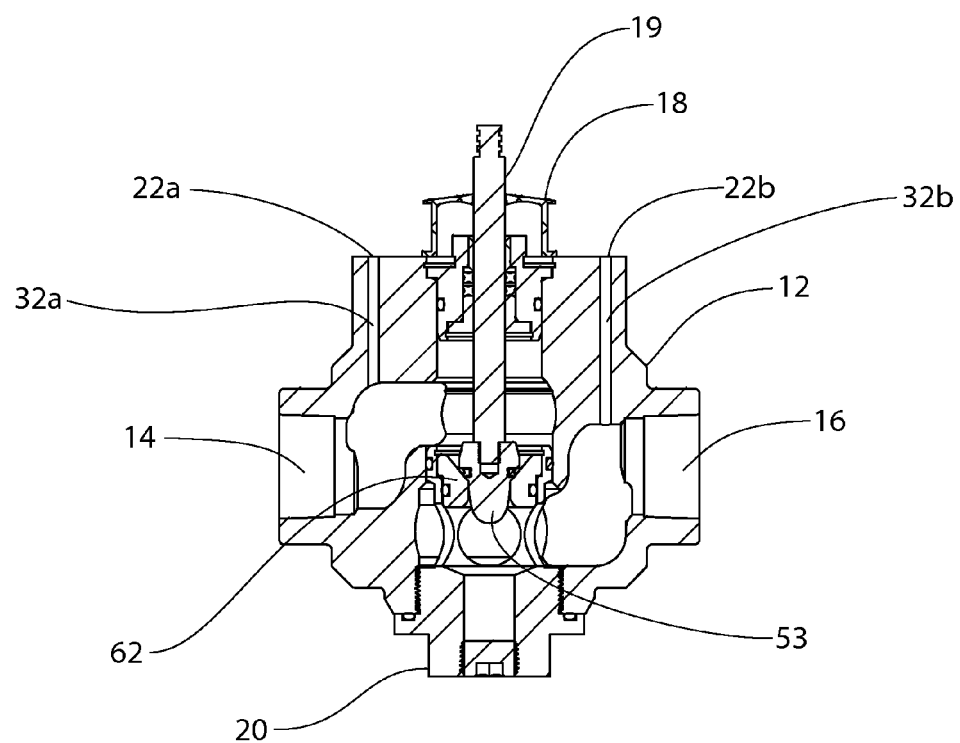
FIG. 3 shows a side cutaway view of a temperature control valve having a bottom-loading, self-contained seat cartridge and a top-loading, self-contained bonnet cartridge in accordance with one or more aspects of the present invention.

Turning now to FIG. 1 through 3, a temperature control valve 10 in accordance with one or more aspects of the present invention is shown. As shown in FIGS. 1 through 3, the control valve 10 may be comprised of a valve body 12, a bonnet cartridge 34, and a seat cartridge 36. As seen in FIG. 1, the control valve body 12 has a fuel entrance port 14 and a fuel exit port 16. The valve body 12 may also be configured with a bonnet manifold 30a in a top section of the valve body 12 for receiving a bonnet cartridge 34 in accordance with the present invention. The valve body may also be configured with a seat cartridge manifold 30b in a bottom section of the valve body 12 for receiving a seat cartridge in accordance with the present invention. The valve body may be made of any sturdy or heat resistant material, such as aluminum, bronze, steel (e.g., stainless steel), brass, and cast iron.

The bonnet manifold 30a may be configured in the top of valve body 12 so that the bonnet cartridge can be secured in the bonnet manifold 30a by inserting the bonnet cartridge into the bonnet manifold and secured using a single snap ring or spiral retaining ring.

The seat manifold 30b may be configured in the bottom of the valve body 12 having a threaded opening so that a threaded seat cartridge 36 may be secured in the seat manifold 30b by rotating or threading the seat cartridge 36 into the seat manifold 30a.

Figure 4:
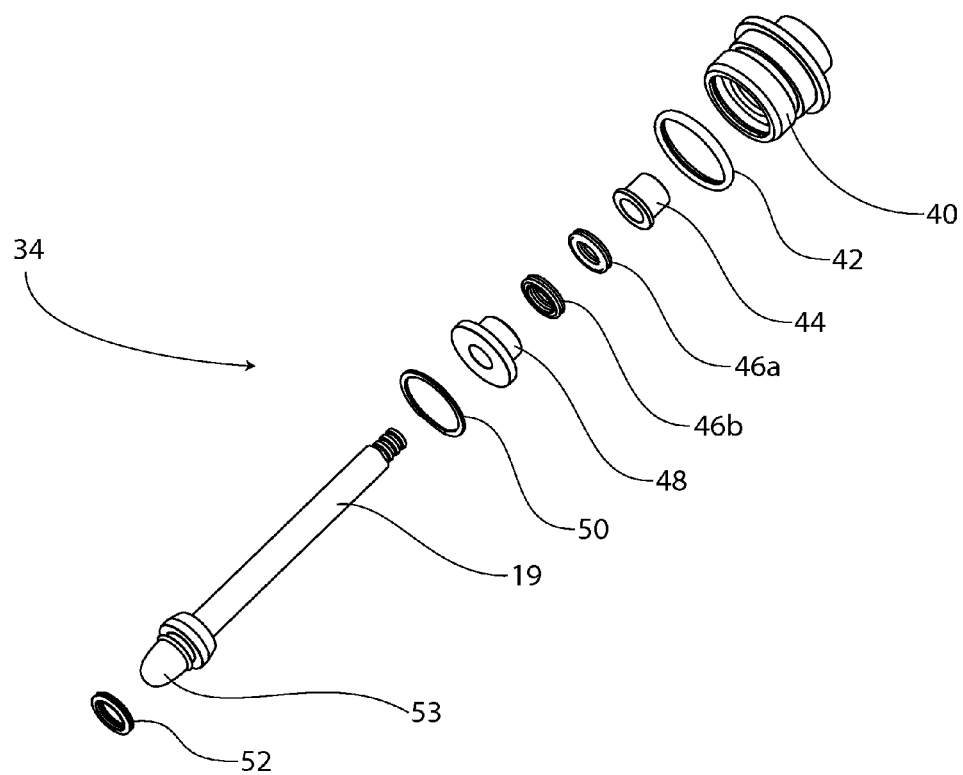
FIG. 4 shows an exploded view of a bonnet cartridge in accordance with one or more the present invention.

As can be seen from FIG. 3, when the bonnet cartridge 34 and the seat cartridge 36 are secured in their respective valve body manifolds 30a, 30b, a valve plug 53 comprising a part of the bonnet cartridge 34 and a valve seat ring 62 comprising a part of the seat cartridge 36 may operate together as valve trim to open and close the control valve 10. The plug 53 may be configured with a plug quad ring seal 52, as shown in FIG. 4, so that when the control valve 10 is actuated into the closed position the rubber quad ring seal 52 disposed on the plug 53 comes into contact with the seat ring 62 just before the metal surface of the plug 53 comes into contact with the seat ring 62. The rubber quad ring seal 52 disposed on the plug 53 compresses until the metal plug 53 touches the metal surface of the seat ring 62. When the plug is resting in the seat ring 62 in the closed position, both the metal surface of the plug 53 and the rubber quad seal ring 52 may be simultaneously in contact with the seat ring 62 providing a dual seal and reducing impact and wear between the metal plug 53 and the metal seat ring 62, which may increase the life of the trim. Thus, as can be seen in FIG. 3, the trim may include dual-seal features wherein a seal formed between the plug 53 and the seat ring 62 has both hard seal and soft seal characteristics.

As can be seen in FIG. 3, the control valve body 12 may include internally disposed upstream and downstream pressure channels 32a, 32b configured to operably connect with other upstream and downstream pressure channels so as to communicate upstream and downstream pressure and pressure changes to electronic pressure transducers. The internally disposed upstream and downstream pressure channels 32a, 32b may connect with additional upstream and downstream pressure channels or conduits at upstream and downstream pressure ports 22a, 22b as seen in FIGS. 1 through 3.

Figure 6:
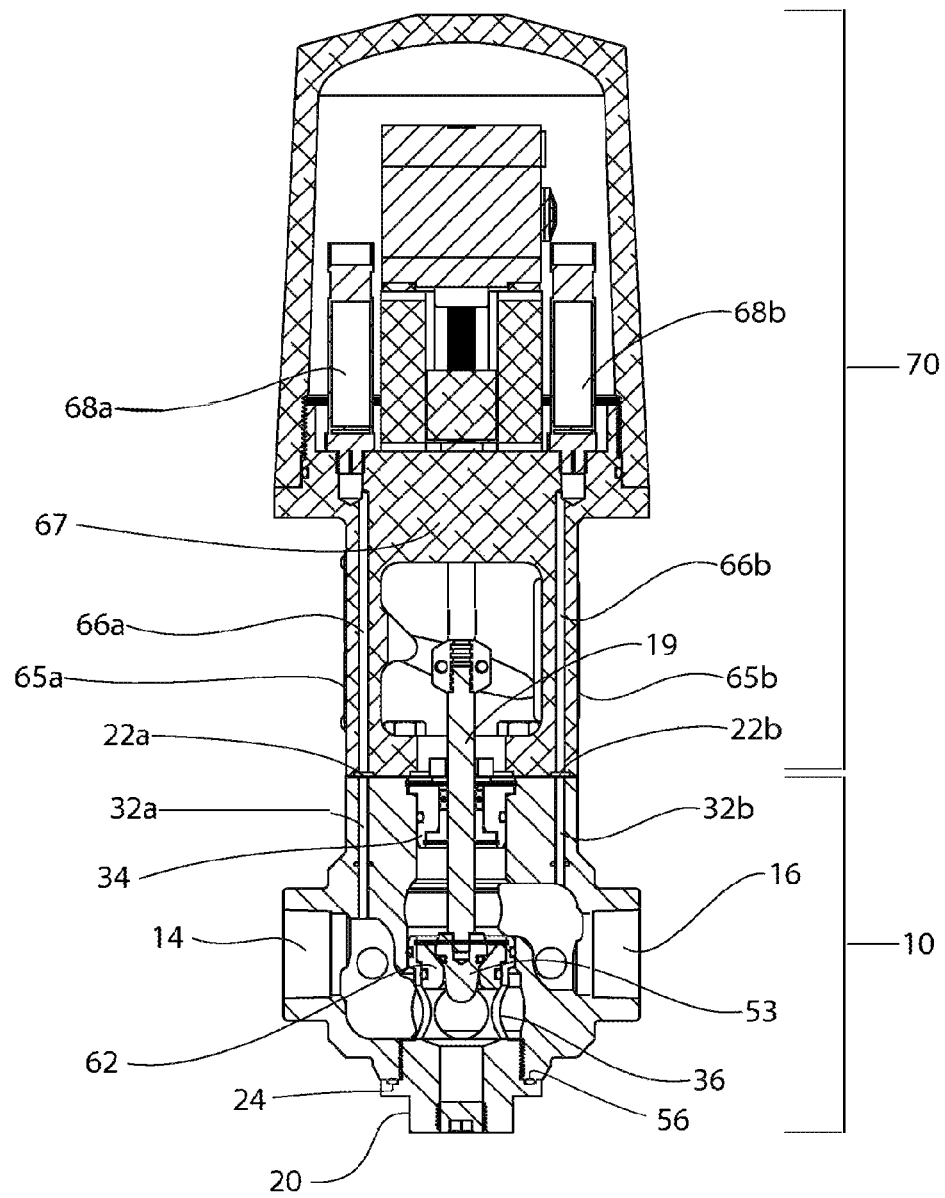
FIG. 6 shows a side cutaway view of a temperature control valve with an actuator assembly operably configured on the top side of the control valve body in accordance with one or more aspects of the present invention.

As can be seen in FIG. 6, in one embodiment of the present invention, the control valve may be configured to operably connect with a control valve actuator assembly 70 having internal pressure channels 66a, 66b disposed in one or more yoke legs 65a, 65b of a yoke component 67 of the control valve actuator assembly 70. The internal pressure channels 32a, 32b of the control valve 10 may extend from within the upstream and downstream sides of the control valve body fuel conduit through the valve body 12 wall and open on a top side of the valve body 12 at the upstream and downstream pressure ports 22a, 22b. By connecting the pressure channels 32a, 32b of the valve body 12 with the pressure channels 66a, 66b disposed in the yoke legs 65a, 65b of the control valve actuator assembly 70, as shown in FIG. 6, pressure changes in the control valve may be detected by electronic pressure transducers 68a, 68b operably connected to the pressure channels 66a, 66b disposed in the actuator yoke 67.

Pressure ports associated with the pressure channels 66a, 66b on a bottom side of the valve mount section of the yoke 67 may operably connect to the upstream and downstream pressure channels 66a, 66b disposed in the valve body 12 at the pressure ports 22a, 22b in the valve body 12. The pressure ports disposed on the bottom side of the valve mount section of the yoke 67 may be disposed within recesses of slotted O-ring grooves. The unique oval O-ring grooves on the bottom side of the yoke 67 may allow the control valve actuator assembly 70 to be rotated 180 degrees to accommodate a right-to-left flow or left-to-right flow and maintain a stroke indicator on the control valve actuator visible for users.

Similarly, the upstream and downstream pressure ports 22a, 22b on the top side of the valve body 12, which may operably connect to the upstream and downstream pressure channels 66a, 66b disposed in the yoke legs 65a, 65b may also be disposed within recesses of slotted O-ring grooves to allow a control valve actuator assembly 70 to be rotated 180 degrees to accommodate a right-to-left flow or left-to-right flow instead of configuring the pressure ports in the yoke legs 65a, 65b with slotted O-ring grooves.

As can be seen from FIG. 6, the control valve 10 may be securely mounted to the valve mount section of the actuator assembly yoke 70 on the top side of the valve body 12 where the upstream and downstream internal pressure channels 32a, 32b exit the valve body 12 at the pressure ports 22a, 22b. The control valve actuator assembly 70 may be secured to the valve body 12 at the valve mount section of the yoke 67 using threaded mounting bolts which can be rotated into threaded holes 26a, 26b, 26c, 26d (shown in FIGS. 1-3) disposed in the valve body 12 and through holes in the valve mount section of the yoke 70.

The integrated internally configured pressure channels 32a, 32b, allows communication of fuel pressure without the use of externally configured tubes or other externally configured componentry which may be required to meet certain safety requirement such as standards for protection against potential explosions, thus reducing the expense of separate external components being required to meet the high safety standards. The internally configured pressure channels 32a, 32b may also reduce the assembly time for configuring a fuel valve train by eliminating the number of components needing to be configured at the time the valve train is assembled.

Opening and closing of the control valve 10 may be actuated by a control valve actuator assembly 70. The control valve actuator 70 may engage and actuate the opening and closing of the control valve 10 using a motor to lift and depress an actuator rod which is connected to a plug stem 19 of the bonnet cartridge 34 using a stem clamp.

The bonnet cartridge 34 may be an internally self-contained top-loading cartridge. As shown in FIG. 4, the bonnet cartridge may be comprised of a bonnet cartridge housing 40, a bonnet cartridge housing O-ring 42, a stem bushing 44, one or more stem seal quad rings 46a, 46b, a stem guide 48, a spiral retaining ring 50, a plug stem 19, a plug 53, and a plug quad ring seal 52. To assemble the bonnet cartridge 34, the housing O-ring 42 may be fitted into the seal ring groove on the bonnet cartridge housing 40, and then each of the stem bushing 44, the one or more stem seal quad rings 46a, 46b, and the stem guide 48 may be fitted in the bonnet housing box of the bonnet cartridge housing as shown in FIGS. 3 and 4. The stem bushing 44, the one or more stem seal quad rings 46a, 46b, and the stem guide 48 may be secured in a bonnet housing box of the bonnet cartridge housing a spiral retaining ring 50 that snaps into the bonnet cartridge housing.

O-rings and quad ring seals used in the bonnet cartridge 34 may be made of elastomer rubber. The bonnet cartridge housing 40, the stem bushing 44, the stem guide 48, the plug stem 36, and the plug may be made of any sturdy or heat resistant material, such as aluminum, bronze, steel (e.g., stainless steel), brass, or cast iron.

The plug quad ring seal 52 is fitted into a seal ring groove on the plug and the plug stem 19 is inserted at a threaded end opposite the plug through the openings in the center of the stem guide 48, the one or more stem seal quad rings 46a, 46b, and the stem bushing 44 and through the top center opening of the bonnet cartridge housing 40. The stem seal quad rings 46a, 46b create a seal against the plug stem 19 and help prevent pressure from escaping from the control valve 10 along the plug stem 19.

Packing commonly used in the industry, such as V-rings, rope packing, or other types of packing that are normally stiff and require a considerable load to be placed on them to cause them to expand and create a seal against the plug stem, using a spring or other load actuating device. Unlike common packing materials, the stem seal quad rings 46a, 46b are made of elastomer rubber and create a seal against the plug stem without using a spring or other load creating device to energize and expand the packing.

The bonnet cartridge housing O-ring 42 helps create a seal between the bonnet cartridge housing 40 and the control valve body 12 as shown in FIGS. 3 and 6.

Figure 5:
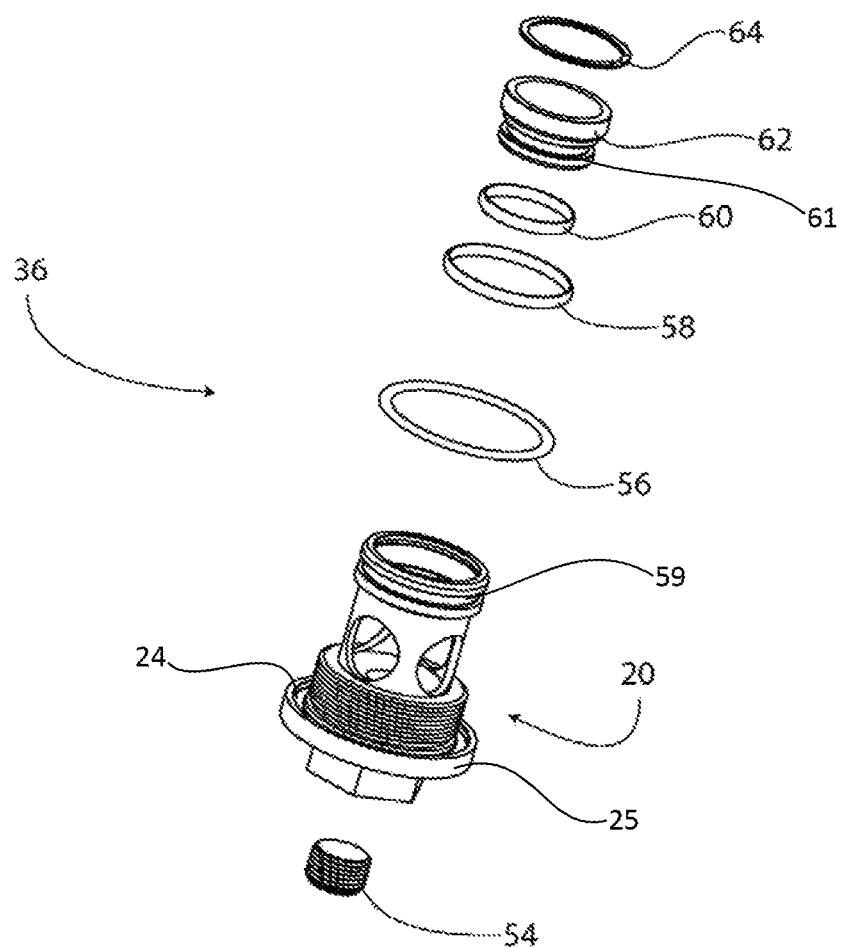
FIG. 5 shows an exploded view of a seat cartridge in accordance with one or more aspects of the present invention.

Turning now to FIGS. 3 and 5, the seat cartridge 36 may be an internally self-contained bottom-loading cartridge. As shown in FIGS. 3 and 5, the seat cartridge 36 may be comprised of seat cartridge housing 20 having an integrated clean out port, a threaded clean out plug 54 for opening and closing the clean out port, a lower cartridge O-ring 56, an upper cartridge O-ring 58, a seat O-ring 60, a seat ring 62, and a spiral retaining ring 28.

O-ring seals used in the seat cartridge may be made of elastomer rubber. The seat cartridge housing 20, the clean out plug 54, and the seat ring 62 may be made of any sturdy or heat resistant material, such as aluminum, bronze, steel (e.g., stainless steel), brass, or cast iron using any method commonly used by those skilled in the art.

The seat cartridge 36 may be assembled by fitting the lower cartridge O-ring 56 into the seal ring groove 24 around the outer lip 25 of the seat cartridge housing 20, fitting the upper cartridge O-ring 58 into the seal ring groove 59 adjacent to the seat ring case of the seat cartridge housing 20, fitting the seat O-ring 60 into the seal ring groove 61 around the seat ring 62, and then inserting the seat ring 62 into the seat ring case of the seat cartridge housing 20. The seat ring 62 is then secured in the seat ring case of the seat cartridge housing 20 using a spiral retaining ring 64 that snaps into place.

The lower cartridge O-ring 56 helps create a seal between the seat cartridge housing 20 and the outer surface of the control valve body 12 as shown in FIGS. 3 and 6.

The upper cartridge O-ring 58 helps create a seal between the inlet and outlet of the valve and prevents flow from passing between the seat cartridge housing 20 and the inner wall of the valve body. The seat O-ring 60 helps prevent pressure from escaping between the seat 62 and the seat cartridge housing 20.

The seat ring 62 may be inserted in the seat ring case of the seat cartridge housing 20. The spiral retaining ring 64 maintains the seat 62 properly positioned and prevents it from coming out of the seat ring case when the control valve is opening and closing.

The dual self-contained cartridges of the control valve of the present invention permits quick and simple replacement of valve parts significantly reducing labor costs.

There is thus disclosed an improved control valve having independent bonnet and seat cartridges, internally integrated pressure channel ports, and a dual-seal trim. It will be appreciated that numerous changes may be made to the present invention without departing from the scope of the claims.

What is claimed is:

1. A modular control valve seat cartridge comprising:
    a seat cartridge housing, a lower cartridge O-ring, an upper cartridge O-ring, a seat O-ring, a seat ring, and a spiral retaining ring,
    the lower cartridge O-ring being disposed on a seal ring groove around an outer lip of the seat cartridge housing adjacent to a first end of the seat cartridge housing, wherein the seal ring groove is disposed in a surface of the outer lip that is facing a second end of the seat cartridge housing,
    the upper cartridge O-ring being disposed in a seal ring groove adjacent to the second end of the seat cartridge housing adjacent to where the seat cartridge housing may receive the seat ring,
    the seat O-ring being disposed in a seal ring groove around the seat ring, and
    the seat ring being secured in the seat cartridge housing by the spiral retaining ring,
    wherein, the seat cartridge housing and the seat ring are configured as a single self-contained cartridge.

2. The control valve seat cartridge of claim 1, wherein the seat cartridge housing includes an integrated clean out port.

3. The control valve seat cartridge of claim 2, wherein the seat cartridge housing includes a threaded clean out plug for opening and closing the integrated clean out port.

4. The control valve seat cartridge of claim 1, wherein the seat ring and the seat cartridge housing are configured for insertion into a control valve body configured with a first manifold having an opening disposed on a top side of the control valve body and a second manifold having an opening disposed on a bottom side of the control valve body, wherein the first manifold is configured for receiving a bonnet cartridge and the second manifold is configured for receiving a seat ring and a seat cartridge housing when the seat ring is secured to the seat cartridge housing.

5. The control valve seat cartridge of claim 4, the seat cartridge housing is configured to be secured within a control valve body using a spiral retaining ring.

6. The control valve seat cartridge of claim 1, wherein the seat ring is configured for receiving a valve plug having a seal ring disposed on a perimeter of the valve plug.

7. The control valve seat cartridge of claim 1, wherein the seat ring is comprised of metal and is configured for receiving a metal valve plug having a rubber seal ring disposed on a perimeter of the metal valve plug; wherein the seat ring is further configured so that a first seal may be created between the metal surface of the seat ring and a rubber seal ring disposed on the perimeter of a metal valve plug and a second seal may be created between the metal surface of the seat ring and a metal surface of the metal valve plug.

* * * * *